United States Patent
Loth

(10) Patent No.: US 7,040,482 B2
(45) Date of Patent: May 9, 2006

(54) BEARING LIFE EXTENDER FOR CONVEYOR TYPE ROLLERS

(75) Inventor: John L. Loth, Morgantown, WV (US)

(73) Assignee: West Virginia University, Morgantown, WV (US)

( * ) Notice: Subject to any disclaimer, the term of this patent is extended or adjusted under 35 U.S.C. 154(b) by 0 days.

(21) Appl. No.: 10/695,551

(22) Filed: Oct. 28, 2003

(65) Prior Publication Data

US 2004/0175067 A1   Sep. 9, 2004

Related U.S. Application Data

(60) Provisional application No. 60/452,141, filed on Mar. 3, 2003.

(51) Int. Cl.
*B65G 13/02* (2006.01)

(52) U.S. Cl. ..................................... 198/782

(58) Field of Classification Search ............... 198/624, 198/780, 781.6, 782; 193/37, 35 R; 384/418, 384/419, 425
See application file for complete search history.

(56) References Cited

U.S. PATENT DOCUMENTS

| | | | | |
|---|---|---|---|---|
| 3,846,901 A | * | 11/1974 | Lovett | 29/450 |
| 4,202,163 A | * | 5/1980 | Turk et al. | 57/401 |
| 4,213,523 A | * | 7/1980 | Frost et al. | 193/37 |
| 4,339,159 A | * | 7/1982 | Miller | 384/539 |
| 4,768,761 A | * | 9/1988 | Kramer | 267/154 |
| 5,088,596 A | * | 2/1992 | Agnoff | 198/788 |
| 5,234,100 A | * | 8/1993 | Cook | 198/842 |
| 5,407,054 A | * | 4/1995 | Matsuda et al. | 198/370.09 |
| 5,421,441 A | * | 6/1995 | Mason | 193/35 R |
| 5,421,442 A | * | 6/1995 | Agnoff | 193/37 |
| 5,524,740 A | | 6/1996 | Conley | |
| 5,718,766 A | * | 2/1998 | Vignot et al. | 118/423 |
| 5,806,653 A | * | 9/1998 | Ahls et al. | 198/326 |
| 6,068,024 A | * | 5/2000 | Hehr | 138/106 |
| 6,158,572 A | * | 12/2000 | Butler et al. | 198/624 |
| 6,158,574 A | * | 12/2000 | Williams et al. | 198/791 |
| 6,305,529 B1 | * | 10/2001 | Scottie | 198/842 |
| 6,527,097 B1 | * | 3/2003 | Dreyer | 193/35 A |

FOREIGN PATENT DOCUMENTS

GB    2 248 816    *  4/1992

* cited by examiner

*Primary Examiner*—Douglas Hess

(57) ABSTRACT

Rollers used on conveyors and inside the zinc-pot of a steel-sheet galvanizing line are usually driven by friction between the roller and the belt or sheet. Such rollers operating in high temperature furnaces or in a hot zinc pot of a steel galvanizing line often have limited or no lubrication The invention herein utilizes bearings which are smaller in diameter and longer than conventional bearing system used in rollers, without an increase in shaft bending moment. This is made possible by changing from a rotating cantilevered shaft to a stationary shaft strengthened to be substantially non-deflecting on either side of the bearings. Such a stationary shaft can be smaller in diameter to reduce bearing friction torque. In addition such a shaft can have increased bearing contact area and assure bearing alignment, all of which contribute to increased bearing life. A device is provided for increasing the buoyancy of a submerged roller.

19 Claims, 1 Drawing Sheet

BEARING LIFE EXTENDER FOR CONVEYOR TYPE ROLLERS

This application is in reference to U.S. Provisional Patent Application No. 60/452,141 filed on Mar. 3, 2003.

This invention was made with Government support under Grant (or Contract) No. DE-FC07-01ID14042, awarded by the Department of Energy. The Government has certain rights in this invention.

BACKGROUND FOR THE INVENTION

1. Field of Invention

This invention relates to conveyor type rollers including those submerged in the zinc-pot of a galvanizing line. The bearings of these rollers are designed to minimize the torque required to keep them turning by the friction between the roller surface and roller driving belt or sheet. When such a roller stalls, the resulting damage to the conveying belt or sheet, especially in steel galvanizing lines, is a major concern. This invention discloses an alternate roller bearing/shaft configuration capable of reducing bearing friction torque as well as extending the life of the bearings.

2. Background

Rollers used on conveyors and inside the zinc-pot of a steel-sheet galvanizing line are usually driven only by friction between the roller and the belt or sheet. Bearing friction torque and associated wear depends mostly on: roller load, roller weight, contacting bearing materials, their surface finish and bearing diameter. Most important for bearing wear rate are: bearing materials, lubrication, temperature, velocity, average contact pressure and degree or clearance and roundness of the bearing sleeve inside each bearing housing. Bearing wear rate increases dramatically with miss-alignment of the bearing housings and with shaft deflection. The allowable bending stress in the shaft, limits the bearing diameter (D) and length (L). Rollers operating in high temperature furnaces or in a hot zinc-pot of a steel galvanizing line often have negligible lubrication. In such cases, bearing life may be limited to only one week of operation.

Most rollers have a rotating shaft which turns in a stationary bearing housing at each end. Sometimes the shaft and roller are machined out of one piece of material. For cylindrical shell type rollers, short shafts are welded to plugs, which in turn are welded into the two roller ends. Assuming the bearing portion of such a shaft carries a uniformly distributed load (F) on a cantilevered beam of length (L), then its maximum bending moment is:

$$M_{max} = \frac{F*L}{2}$$

and maximum shaft deflection:

$$\Delta y_{max} = \frac{F*L^3}{8EI}.$$

SUMMARY OF THE INVENTION

Disclosed herein is an alternate method of supporting a conveyor type roller by using a stationary shaft of special shape which extends axially and concentrically through a hollow roller, while configuring said shaft such as to be substantially non-deflecting in between the bearing segments. Assuming the bearing portion of such a shaft carries a uniformly distributed load (F) on a beam of length (L) and fixed at both ends then: maximum bending moment $$M_{max} = \frac{F*L}{12}$$

and maximum deflection $$\Delta y_{max} = \frac{F*L^3}{384EI}.$$

Assuming the bearing portion of such a shaft carries a uniformly distributed load (F) on a beam of length (L) and fixed at one end, but only simply supported at other end then: maximum bending moment $$M_{max} = \frac{F*L}{8}$$

and maximum deflection $$\Delta y_{max} = \frac{F*L^3}{185EI}.$$

With the herein disclosed stationary shaft one can reduce the maximum shaft bending moment by up to 12/2=6 times, and reduce maximum shaft deflection up to 384/48=8 times. An additional advantage of a stationary shaft is that it is not subjected to cyclic loading like a rotating shaft; therefore the allowable bending stress can be increased. Both factors contribute to an allowable reduction in bearing diameter, with associated reduction in friction torque and bearing contact velocity. At the same time bearing length and contact area may be increased to reduce the contact pressure and thus wear rate. The most significant reduction in bearing wear rate is from improved contact pressure uniformity because of the reduced shaft deflection. Maintaining bearing alignment is also important for extended bearing life, and assured with a stationary shaft because then all bearing housings are fitted inside the same hollow roller.

The embodiment of the invention is to make a stationary shaft substantially non-deflecting on either side of the bearings, so as to load each bearing segment like beam fixed at both ends or at least fixed on the inside towards the middle of the shaft and simply supported at shaft ends. This means that the bearing housing sleeve or inserts must rotate with the roller about the stationary shaft. Making the shaft substantially non-deflecting or fixed in between each bearing pair can be accomplished by increasing its diameter. After the roller with its bearing housings has been assembled on the stationary shaft, the shaft ends extending beyond the two outer bearings are best fixed and thereby rendered substantially non-deflecting. This can be achieved by adding rigid removable shaft clamps, which in turn are fastened to the roller supports.

The herein disclosed stationary shaft configuration requires that the bearing housings must be attached to the hollow cylindrical roller and be removable for service. The bearing housings can be fixed inside the cylindrical roller by means of short anchor bolts or tie rods extending from end to end. To transmit torque between the bearing housing and the roller at least one or more keys are employed. When utilizing tie rods from end to end, there must be enough clearance in these keys to allow for differences in thermal expansion between the roller and the shaft.

Another advantage of having the bearing housing rotate with the roller is that it can be configured with radial ribs to center each housing within the roller. Those ribs can also serve as radial vanes of a centrifugal fan/pump so as to motivate the surrounding fluid to flow in the radial direction, through ports in the wall of the cylindrical roller and through ports in the rotating bearing housing sleeve. Such fluid flow is beneficial to improve bearing cooling and possibly lubrication.

Another advantage of dealing with a stationary roller shaft is to allow cooling of the bearings, by means of cooling passages drilled on the inside of the shaft, and accessible from each end.

By adding a thrust washer to either end of the increased diameter shaft center section the roller can also support radial and axial loads.

When the roller operates submerged in a fluid then adding one or more hollow sealed tubes to its inside can augment roller buoyancy. Roller weight is important as it adds to both bearing load and bearing friction torque.

Flow turbulence within the narrow space between the stationary shaft and the rotating cylinder may need to be minimized by adding a cylindrical sleeve on the inside.

DETAILED DESCRIPTION OF THE PREFERRED EMBODIMENT

Figure 1:
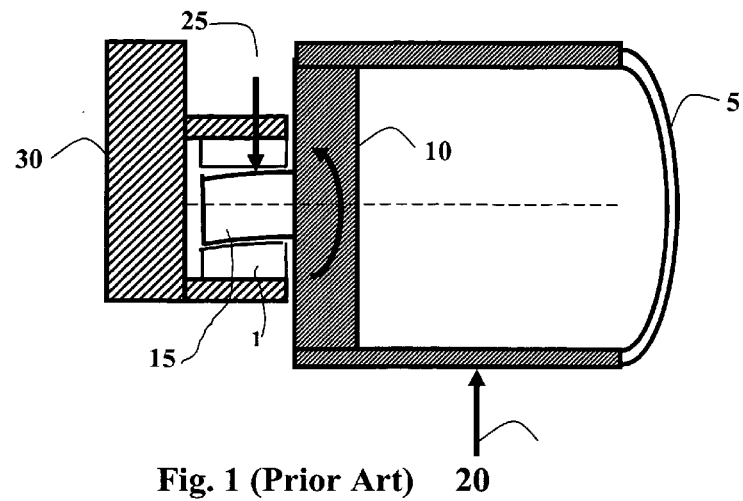
FIG. 1 is a schematic of a conventional conveyor roller. It uses a shaft, which rotates in stationary bearing housings.

For comparison purposes, one of two identical ends of a conventional roller, as used on conveyors and inside the zinc-pot of a steel-sheet galvanizing line, is shown in FIG. 1. Such a roller consists of a rotating shaft attached to the roller and held in place at each end by a stationary bearing housing with bearing sleeve or inserts 1. The cylindrical roller 5 is often hollow and therefore a sectional view of such roller has been shown. End plug 10 is welded to both the cylindrical roller and to a short-cantilevered shaft 15. The roller load provided by the conveyed sheet or belt, produces a force (F) on each of the roller bearings as indicated by arrow 20. This force is transmitted via the roller to shaft 15, which then deflects under load inside the bearing. The reaction to force (F) by the bearing housing sleeve or inserts is indicated by arrow 25. Each of the two bearing housings is mounted on a stationary support 30.

When such a roller is used for sheet steering, the two end bearing housing supports must remain aligned to prevent non-uniform loading with associated increased wear rate. Such a roller shaft deflects like a cantilevered beam of length (L). Assuming the load is uniformly distributed then: maximum bending moment:

$$M_{max} = \frac{F*L}{2}$$

and maximum deflection:

$$\Delta y_{max} = \frac{F*L^3}{8EI}.$$

Figure 2:
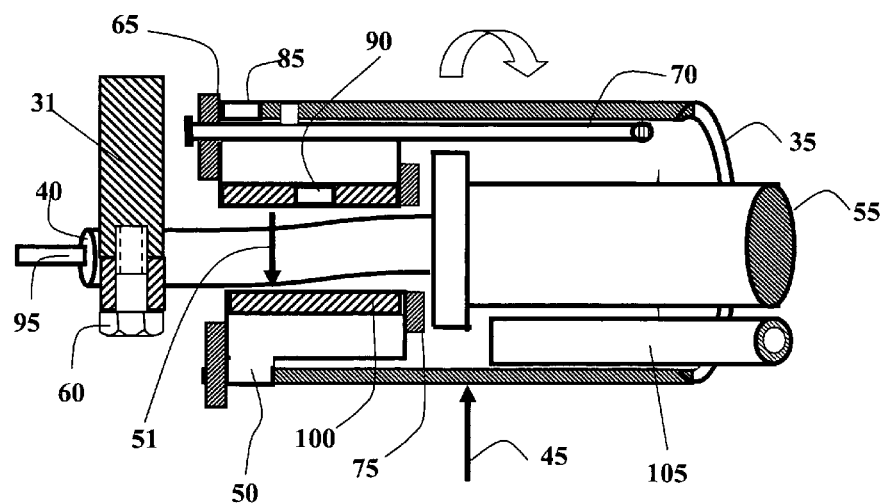
FIG. 2 is a schematic embodiment of the herein disclosed invention titled "bearing life extender for conveyor type rollers". It represents an alternate method of supporting a conveyor type roller by using a stationary shaft of special shape which extends axially and concentrically through a hollow roller, while configuring said shaft such as to be substantially non-deflecting in between the bearing segments. The bearing housings are rotating with the roller as they are keyed to it.

One of two identical ends of the herein disclosed "bearing life extender for conveyor type rollers" is shown in FIG. 2. The most noticeable difference with the conventional roller configuration shown in FIG. 1 is that roller 35 rotates about a stationary shaft 40. This requires the roller to be hollow, therefore a sectional view of this roller is shown in FIG 2. The stationary shaft 40 must be rendered substantially non-deflecting in between each bearing pair. Therefore its diameter 55 has been increased in between each bearing pair. Outside the two bearings, shaft clamp 60 is used to secure the shaft to each support 31. The loading by a sheet or belt produces a force (F) on each bearing as indicated by arrow 45. This force is transmitted via the rotating bearing housing 50 and its bearing sleeve or inserts 100 to shaft 40. The force (F) on the roller creates reaction force 51 by the stationary shaft. Each bearing housing 50, is keyed to roller 35 to rotate together. Assuming the small diameter bearing segments of such a stationary shaft deflect like beams of length (L), fixed rigidly at each end, with a uniformly distributed load (F), then the maximum bending moment:

$$M_{max} = \frac{F*L}{12}$$

and maximum deflection $$\Delta y_{max} = \frac{F*L^3}{384EI}.$$

Depending on the amount of shaft rigidity achieved at either end of the small diameter bearing segments, the maximum shaft bending moment maybe reduced up to 12/2=6 fold. This allows using a smaller bearing diameter for reduced bearing friction torque and contact velocity and simultaneously increase its length to reduce bearing contact pressure and associated wear. The shaft deflection may be reduced up to 384/8=8 times. At least one buoyant element 105, having a mass density less than the fluid in which the roller is immersed, may be attached to the inside of the roller to increase roller buoyancy when submerged. These advantages together with assured bearing alignment provides for the herein claimed bearing life extension for conveyor type rollers. For maintenance purposes, the bearing housings 50 have to be removable. The bearing housing or inserts can be held in position by adding end plates 65, which are attached to the roller by short anchor bolts or by tie rods 70 running the full length of the roller. Because shaft 40 is thicker in between the bearings, as indicated by 55 it can also serve as a thrust bearing 75. Such a dual function applies to any bearing type. The bearing could also have been made tapered to take care of both radial and axial loads but that is less desirable because it increases the required clearance to allow for differences in thermal expansion.

Another advantage of having the bearing housing rotate with the roller is that it can be centered inside the cylindrical roller wall by rib like supports. They also serve as radial vanes of a centrifugal fan or pump so as to motivate the surrounding fluid to flow in the radial direction, entering through port 90 in the bearing housing sleeve 100 and exiting through ports 85 in the wall of the cylindrical roller. Such fluid flow provides bearing cooling and possible lubrication. It is understood that "fluid" is either a gas or liquid, and includes liquid metals.

Another advantage of having a stationary roller shaft is to simplify forced cooling of high temperature furnace roller bearings by means of cooling passages 95 drilled on the inside of the stationary shaft.

The various preferred embodiments described above are merely descriptive of the present invention and are in no way intended to limit the scope of the invention. Modifications of the present invention will become obvious to those skilled in the art in light of the detailed description above, and such modifications are intended to fall within the scope of the appended claims.

I claim:

1. An apparatus for supporting a conveyer type submerged roller comprising:
   a substantially hollow cylindrical roller submerged in a fluid;
   a stationary shaft, having two ends, extending along the longitudinal axis of the roller and fixed or supported at each end;
   a plurality of bearing housings with sleeves or inserts, fixed to the roller such that the bearing housings rotate with the roller;
   the roller bearing housings secure sleeve or insert bearing surfaces to contact mating bearing surfaces on the stationary shaft;
   the stationary shaft has increased lateral moment of inertia adjacent to at least one bearing housing.

2. The apparatus of claim 1 wherein each roller bearing housing comprises at least a bearing material sleeve.

3. The apparatus of claim 1 wherein each roller bearing housing comprises at least a bearing material insert.

4. The apparatus of claim 1 wherein there are radial and axial bearing surfaces, one to withstand radial roller loads and the other to withstand axial thrust roller loads with respect to the stationary shaft.

5. The apparatus claim 1 wherein the bearing housings are fixed to the roller by at least one keyway to transmit torque from the bearing housing to the roller.

6. The apparatus claim 1 wherein the bearing housings are scoured to the roller by at least one short anchor bolt or at least one tie rod axially positioned within the substantially hollow cylindrical roller.

7. The apparatus of claim 1 further comprising end plates on either side of the bearing housings to secure the roller bearing sleeves or inserts.

8. The apparatus of claim 1 wherein the bearing housings are secured to the roller by vane like ribs to motivate the flow of fluid radially outward as the roller rotates.

9. The apparatus of claim 1 wherein the bearing surfaces are ported to admit the liquid as a coolant or bearing lubricant.

10. The apparatus of claim 1 wherein at least one tie rod is enclosed within at least one cylindrical shell section interleaved between the bearing housings within the roller.

11. The apparatus of claim 1 wherein the buoyancy of the submerged roller is increased by including at least one cylindrical tube within the contained volume of the roller with mass density less tan that of the surrounding fluid.

12. The apparatus of claim 1 wherein the stationary shaft includes coolant passages.

13. The apparatus of claim 1 wherein the roller is operating submerged in a molten zinc-pot of a steel galvanizing line.

14. A method for supporting a conveyer type submerged roller comprising: securing a substantially hollow cylindrical roller submerged within a liquid on a stationary shaft extending axially and concentrically through the roller;
    mounting means for roller bearing housings to the interior of the roller to mate wit bearing surfaces on the stationary shaft;
    varying the lateral moment of inertia of the stationary shaft interleaved within the bearing surfaces.

15. The method of claim 14 further comprising positioning means for the bearing surfaces.

16. The method of claim 14 further comprising cooling means for the bearing surfaces using the submersion liquid.

17. The method of claim 14 further comprising cooling means for the bearings by coolant flow through the interior of the stationary shaft.

18. The method of claim 14 further comprising increasing buoyancy of the submerged roller with low density inserts attached to the inside of the roller.

19. An apparatus for supporting a conveyer type submerged roller comprising:
    a substantially hollow cylindrical roller submerged in a fluid;
    a stationary shaft having two ends, extending along the longitudinal axis of the roller and fixed or supported at each end;
    a plurality of bearing housings with sleeves or inserts, fixed to the roller such that the bearing housings rotate with the roller;
    the roller bearing housings secure sleeve or insert bearing surfaces to contact mating bearing surfaces on the stationary shaft;
    at least one thin cylindrical tube within the contained volume of the roller having a mass density less than that of the fluid in which the roller is submerged.

* * * * *